United States Patent [19]
Lawson et al.

[11] Patent Number: 4,947,039
[45] Date of Patent: Aug. 7, 1990

[54] FLAT STATIONARY FIELD LIGHT BEAM SCANNING DEVICE

[75] Inventors: John A. Lawson; John C. Butler, both of Centerville; Richard Sutera, Dayton; Lawrence C. Calhoun, Lebanon; Danny Potts, Dayton; Larry E. Price, Kettering; Robert G. Wolfe, Xenia, all of Ohio; Joseph D. Knox, Westford, Mass.; Paavo Loosberg, Scarborough, Canada

[73] Assignee: Eotron Corporation, Dayton, Ohio

[21] Appl. No.: 258,649

[22] Filed: Oct. 17, 1988

[51] Int. Cl.$^5$ ............................................. H01J 3/14
[52] U.S. Cl. ..................................... 250/236; 350/6.7
[58] Field of Search .................... 250/234–236; 358/293, 294, 296, 481, 494; 346/108; 350/6.5, 6.7, 6.8

[56] References Cited

U.S. PATENT DOCUMENTS

| | | | |
|---|---|---|---|
| 3,668,984 | 6/1972 | Rosin | 106/220 |
| 3,970,359 | 7/1976 | Starkweather | 350/6.8 |
| 3,973,825 | 8/1976 | Starkweather | 350/6.8 |
| 4,216,378 | 8/1980 | Monette | 250/235 |
| 4,257,053 | 3/1981 | Gilbreath | 346/108 |
| 4,284,994 | 8/1981 | Radl | 346/108 |
| 4,290,086 | 9/1981 | Spencer et al. | 358/293 |
| 4,312,590 | 1/1982 | Harbaugh | 350/6.7 |
| 4,314,154 | 2/1982 | Minoura et al. | 350/6.7 |
| 4,343,531 | 8/1982 | Tateoka et al. | 350/6.5 |
| 4,449,046 | 5/1984 | Zuckerman et al. | 250/235 |
| 4,477,727 | 10/1984 | Rud | 250/235 |
| 4,623,791 | 11/1986 | Kaneko et al. | 250/234 |
| 4,629,885 | 12/1986 | Asemyr | 250/235 |
| 4,637,679 | 1/1987 | Funato | 350/6.5 |
| 4,690,485 | 9/1987 | Plaot | 350/6.5 |
| 4,707,085 | 11/1987 | Takanashi et al. | 350/6.1 |
| 4,727,381 | 2/1988 | Bille et al. | 369/44 |
| 4,754,291 | 6/1988 | Horikawa | 358/296 |

Primary Examiner—David C. Nelms
Assistant Examiner—Stephone B. Allen
Attorney, Agent, or Firm—Killworth, Gottman, Hagan & Schaeff

[57] ABSTRACT

A light beam scanning device and method comprises a first input source for providing a scanning light beam and a flat stationary scanning surface to be scanned by the beam. An f sine theta lens system focuses the light beam onto the flat stationary scanning surface. A galvanometer mirror provides for repetitively scanning the light beam across the flat stationary scanning surface in a first fast scan direction while a pivoting mirror provides for receiving the light beam and scanning it onto the galvanometer mirror in a second slow scan direction perpendicular to the first direction. The cooperative operation of the galvanometer mirror and the pivoting mirror raster scan the light beam onto the flat stationary scanning surface. A second light source generates a reference light beam which is directed onto a rear mirror surface of the galvanometer mirror from which it is directed to a nonlinear grating having line spacing proportional to 1/(sine theta) for defining the position of the scanning beam in the first direction. The grating is scanned by the reference beam as is reflected from the galvanometer mirror and passes from the grating to a detector for generating a control signal representative of the position of the scanning light beam in the first direction. The grating may be reciprocally moved relative to the galvanometer mirror to compensate for distortion of the image scanned in the flat stationary scanning surface.

19 Claims, 4 Drawing Sheets

FLAT STATIONARY FIELD LIGHT BEAM SCANNING DEVICE

BACKGROUND OF THE INVENTION

The present invention relates generally to a scanning device and a scanning method for causing a beam of light to sweep across a surface and. more particularly, to such a device and method in which the beam is raster scanned onto a flat stationary field.

Scanning devices for sweeping a light beam across a surface are used for a variety of reading and imaging applications. For example, color scanners may employ photoelectric sensors and color filters to analyze a color photograph on a point-by-point basis to produce color component electrical signals for a series of color separations. The signals may then be used to control the exposure of a photographic film or other imaging media which forms the color separations. The imaging media is exposed point-by-point to light modulated in accordance with the color component electrical signals such that the color separations reflect the color component densities at the scanned points on the original photograph. Similar light beam scanning operations are utilized to reproduce original images or paste-up images of printing or photographic plates for single color such as black and white reproduction. Additionally, scanning performed by sweeping a beam of light across a surface is utilized in facsimile and character recognition systems.

Light beam scanning devices have evolved from the simplest scanners wherein the image or imaging media to be scanned was curved and secured to an internal or external drum system. The drum was then mechanically moved to scan the image or imaging media by means of a stationary light beam typically generated by means of a laser. Optically, such systems are very simple. However, the image or imaging media must be secured to a rapidly moving drum which creates significant handling problems since a relatively bulky drum must not only be moved rapidly and with high precision but also with very smooth motion. In addition, such drum scanninq systems require movement over different distances, i.e., movement scaling, as the image or imaging media sizes change. Movement scaling greatly increases the precision and dynamic range required of the combined fast and slow scan motion control system of the scanner.

Light beam scanning systems were improved by moving the light beam in the fast scan direction such that the image or imaging media support drum only had to move in the slow scan direction. While this was a big improvement over preceding scanner systems, curved image or imaging media holders were still required and the slow scan and fast scan motion systems, although now separated, retained the problem of having to be scaled for size changes.

A more recent improvement is the use of a flat field optical system which allows the light beam to fast scan a line in a flat image plane while still providing slow scan movement by moving the image plane. While these systems simplify media holding, since the media is now held flat, they still require two widely separated precision motion systems since the media is still moved to produce the slow scan function. Such systems also retain all the problems of separated motion systems which must be scaled for size changes.

Most flat field scanners use f theta lens systems which convert angular motion of the scanner light beam into a linear motion along a flat line at the image plane. Ideally, one would perform both the fast and slow scans on a flat stationary image field to completely simplify the image or imaging media holder for scanning operations. However, when both the slow and fast scan motions are performed together to raster scan a flat stationary image plane or field, significant distortions are introduced into the scanned image.

Accordingly, there is a need for a stationary flat field light beam scanner which provides high image resolution with low image distortion.

SUMMARY OF THE INVENTION

This need is met by the method and apparatus of the present invention wherein a light beam scanning device includes a deflection system including unified fast scan and slow scan motion systems, the movement of which does not have to be changed for changes in imaqe sizes to be scanned. In the present invention, scaling for different image sizes is done entirely by the optical system such that the fast scan and slow scan motion systems are unaffected. The present invention utilizes an f sine theta lens system to compensate for horizontal line bow and an associated nonlinear grating which compensates for horizontal line linearity. In addition. the nonlinear grating is moved in synchronism with the slow scan motion system to compensate for vertical line bow and such slow scan movement is itself nonlinear to compensate vertical line linearity. Accordingly, the light beam scanning method and apparatus of the invention permits a stationary flat field to be scanned with high image resolution and low image distortion. Further, the scanner permits image size changes by simple changes of the optical system to dramatically reduce system complexity which is otherwise required if the scan motion systems must be changed to accommodate varying image sizes.

In accordance with one aspect of the present invention, a light beam scanning device comprises first light source means for providing a scanning light beam and a flat stationary scanning surface to be scanned by the beam. Lens means are provided for focusing the light beam onto the flat stationary scanning surface. Galvanometer mirror means provide for repetitively scanning the light beam across the flat stationary scanning surface in a first direction while pivoting mirror means provide for receiving the light beam and scanning it onto the galvanometer mirror means in a second direction perpendicular to the first direction. The cooperative operation of the galvanometer mirror means and the pivoting mirror means raster scan the light beam onto the flat stationary scanning surface. Preferably, the lens means comprises an f sine theta lens system.

The light beam scanning device may further comprise second light source means for providing a reference light beam which is directed onto the galvanometer mirror means, preferably onto a rear mirror surface of the galvanometer mirror means. Grating means, which may be nonlinear and preferably has spacing of the grating lines proportional to 1/(sine theta) are provided for defining the position of the scanning beam in the first direction. The grating means is scanned by the reference beam as it is reflected from the galvanometer mirror means and passed from the grating means to detector means for generating a control signal representative of the position of the scanning light beam in the first direction.

The grating means may be reciprocally moved relative to the galvanometer mirror means to compensate for distortion of the image scanned in the flat stationary scanning surface. The reciprocal movement of the grating means is synchronized with the operation of the pivoting mirror means. A lead screw and a linear slide may be used for controlling the pivoting mirror means and the grating means by means of a pivot linkage and an eccentric cam, respectively. Further distortion of the scanned image can be compensated by monitoring the position of the lead screw and controlling the speed of the lead screw as a function of its position.

In accordance with another aspect of the present invention, a method for raster scanning a light beam over a flat stationary field comprises the steps of: directing a scanning light beam onto pivoting mirror means; pivotally moving the pivoting mirror means to slow scan the scanning light beam onto galvanometer mirror means; operating the galvanometer mirror means to fast scan the scanning light beam onto lens means; and focusing the scanning light beam onto the flat stationary field through the lens means. The lens means preferably comprises an f sine theta lens system.

The method for raster scanning a light beam over a flat stationary field may further comprise the steps of: directing a reference light beam onto the galvanometer mirror means; positioning grating means to be scanned by the reference beam as it is reflected from the galvanometer mirror means to define the position of the scanning light beam during sweeps of its fast scan; and a control signal representative of the position of the scanning light beam during sweeps of the fast scan in response to the reference light beam after it has been modulated by the grating means. Preferably, the spacing of the grating lines in the grating means is proportional to 1/(sine theta). The method may further comprise the step of reciprocally moving the grating means relative to the galvanometer mirror means, and the steps of moving the pivoting mirror means and the grating means are preferably synchronously performed.

It is hence an object of the present invention to provide a method and apparatus for scanning a light beam onto a flat stationary field with high image resolution and low image distortion; to provide such a method and apparatus wherein image size changes are made by simple optical changes without changing scan motion utilized by the method and apparatus; to provide such a method and apparatus which utilizes an f sine theta lens system and a compensating grating which is nonlinear and preferably has spacing of the grating lines proportional to 1/(sine theta); and, to provide such a method and apparatus wherein a compensating grating is reciprocally moved in synchronism with the operation of a pivoting scan mirror.

Other objects and advantages of the invention will be apparent from the following description, the accompanying drawings, and the appended claims.

DETAILED DESCRIPTION OF THE INVENTION

The light beam scanning device of the present invention will be described with reference to a tricolor film recorder for which the device is particularly applicable. However, it is to be understood that the invention is generally applicable to any light beam scanning application whether it is reading an image for later reproduction or for generating an image in a sheet of imaging material as in the case of the tricolor film recorder.

Figure 1:
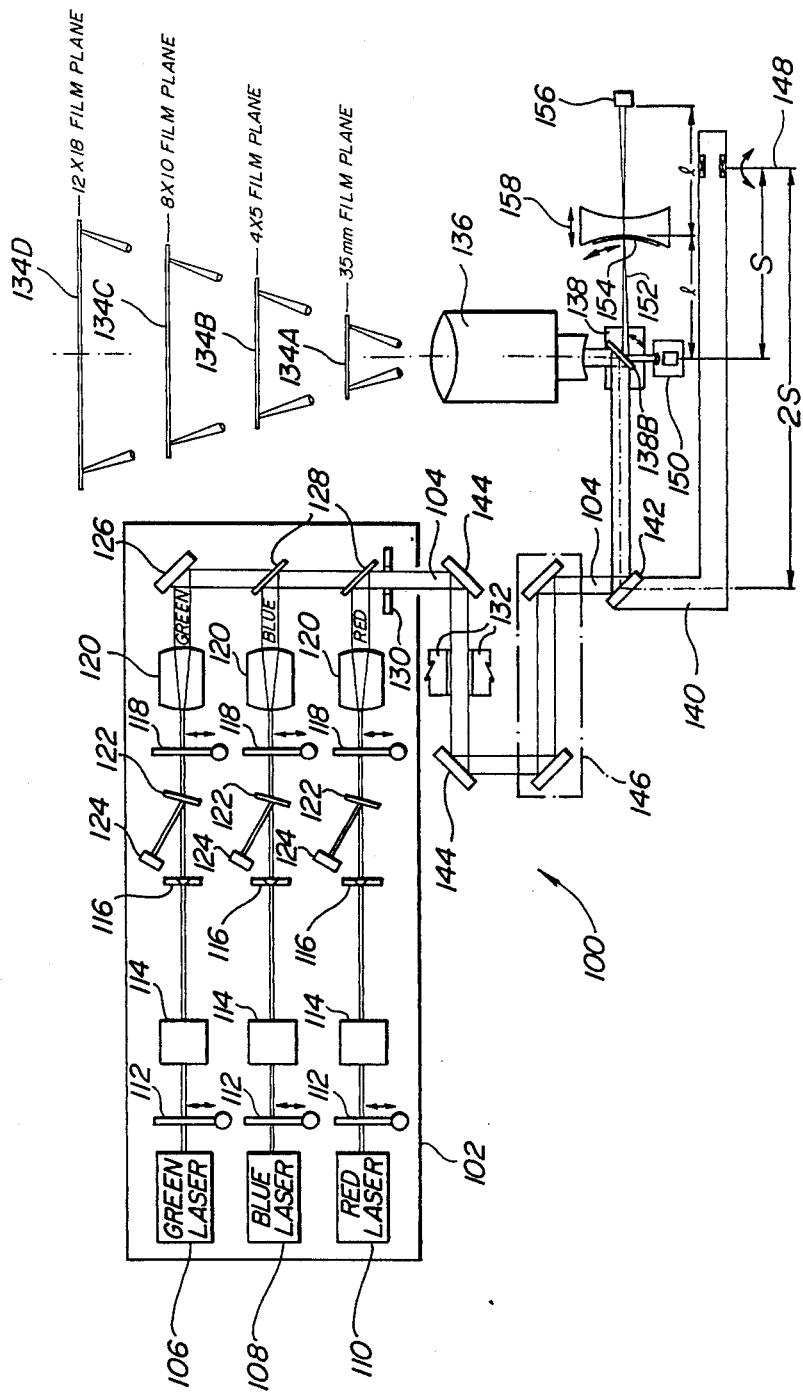
FIG. 1 is a schematic diagram of a light beam scanning device operable in accordance with the present invention.

As shown in FIG. 1, a tricolor film recorder 100 comprises a three color laser engine 102 which forms a writing beam 104. The laser engine 102 comprises a green laser 106, a blue laser 108 and a red laser 110 which pass through a first set of motor driven linear variable attenuators 112, acousto-optic modulators 114, pinholes 116, a second set of motor driven linear variable attenuators 118, and beam expanders 120. The individual laser light beams can be monitored by means of beam splitters 122 and associated detector photodiodes 124. Having been thus processed, the laser light from the green laser 106, the blue laser 108 and the red laser 110 are combined to form the writing beam 104 by means of a first mirror 126 and a pair of dichroic mirrors 128. A safety shutter 130 completes the laser engine 102.

The tricolor film recorder 100 is generally supported upon an optical table 132. The laser engine 102 comprises a first light source means for providing a scanning light beam in the form of the writing beam 104. A flat stationary scanning surface 134 is provided for supporting an imaging media. such as photographic film, which is to be scanned by the writing beam 104. Lens means preferably comprises an f sine theta lens system 136 which produces linear motion in a flat line in the image plane or flat stationary scanning surface 134, which motion is proportional to the sine of the input angle theta. Such lens systems are known in the art as disclosed, for example, in U.S. Pat. No. 4,343,531, which is incorporated herein by reference.

One of the advantages of the present invention is that various image sizes can be accommodated by the tricolor film recorder 100 by simple changes of the optical system, i.e., by changing the lens system 136 and the film holder position at the flat stationary scanning surface 134 as illustrated by the varying sizes of scanning surfaces 134A through 134D.

Galvanometer mirror means 138 are provided for repetitively scanning the light beam 104 across the flat stationary scanning surface 134 in a first direction which corresponds to the fast scan direction for the tricolor film recorder 100. Pivoting mirror means comprising a pivotally mounted pivot arm 140 receives the light beam 104 on a slow scan mirror 142 and scans the light beam 104 onto the galvanometer mirror means 138 in a second direction which is perpendicular to the first direction and corresponds to the slow scan direction for the tricolor film recorder 100. The writing beam 104 is directed onto the slow scan mirror 142 of the pivot arm 140 by means of folding mirrors 144 and a pair of static beam steering mirrors 146.

Accordingly, the cooperative fast scan movement of the galvanometer mirror means 138 and the slow scan movement of the pivot arm 140 perform a raster scan of the writing beam 104 onto the flat stationary scanning surface 134 which is currently in focus as a result of the selected f sine theta lens 136. To minimize distortions in the tricolor film recorder 100, the distance s between the axis 148 of rotation of the pivot arm 140 of the pivoting mirror means should be minimized, and the distance from the axis 148 of rotation of the pivot arm 140 to the center of the slow scan mirror 142 should be 2s A second light source means comprising an infrared laser diode 150 generates a reference light beam 152 which is directed onto the galvanometer mirror means 138 and preferably onto a rear mirror surface 138B thereof. The beam 152 is reflected onto grating means comprising the grating 154 which is preferably cylindrical and nonlinear. More particularly, the grating 154 preferably includes grating lines spaced proportional to 1/(sine theta) where theta is the input angle of the light beam 104 into the f sine theta lens 136. Detector means comprising an infrared photodetector 156 is provided for generating a control signal representative of the position of the scanning light beam 104 in the first direction or fast scan direction in response to the reference light beam 152 after it has been modulated by the grating 154.

The nonlinear grating is most easily made by placing a linear master grating in the focal plane of the f sine theta lens 136 and projecting it at infinity to a grating having lines whose angular relationship is proportional to 1/(sine theta). This is in accordance with the well-known property of lenses that the distortion for one direction of image formation is the inverse of the distortion for the other direction. The aerial image thus created is then projected through a normal f theta lens onto film to generate the required 1/(sine theta) grating. The scale of the grating is determined by selecting the rario of the focal length of the f theta lens to the focal length of the f sine theta lens.

To correct for distortions of the image scanned onto the flat stationary scanning surface 134, the grating 154 is reciprocally moved as indicated by the arrow 158 relative to the galvanometer mirror means 138. The reciprocal movement of the grating 154 is synchronized with the pivotal movement of the pivot arm 140 by means of an eccentric cam as will be described with reference to FIGS. 2-4. Further, the speed of movement of the pivot arm 140 and the grating 154 may be controlled to provide additional compensation for imaging errors which would otherwise occur at the flat stationary scanning surface 134.

Figure 2:
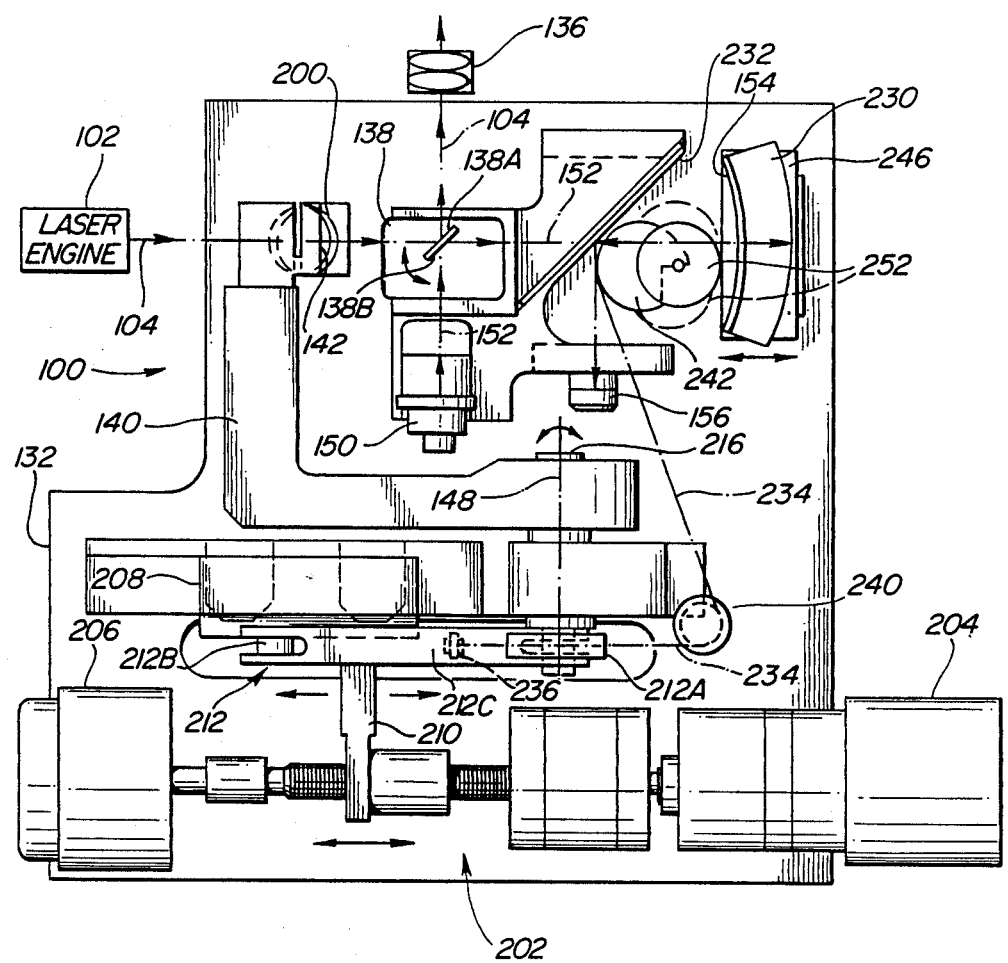
FIG. 2 is a top plan view of a working embodiment of a light beam scanning device of the present invention.
Figure 3:
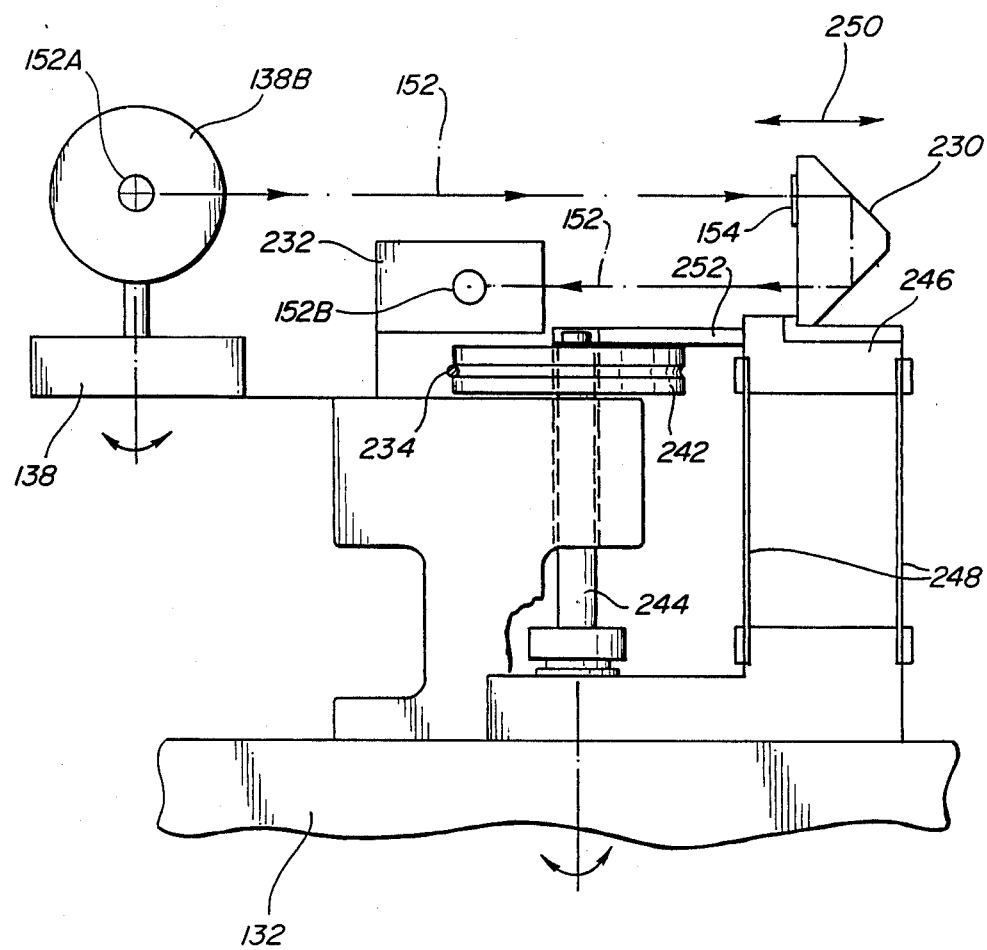
FIG. 3 illustrates utilization of a reference scanning beam and nonlinear grating to control the fast scan of the light beam scanning device of FIG. 2.
Figure 4:
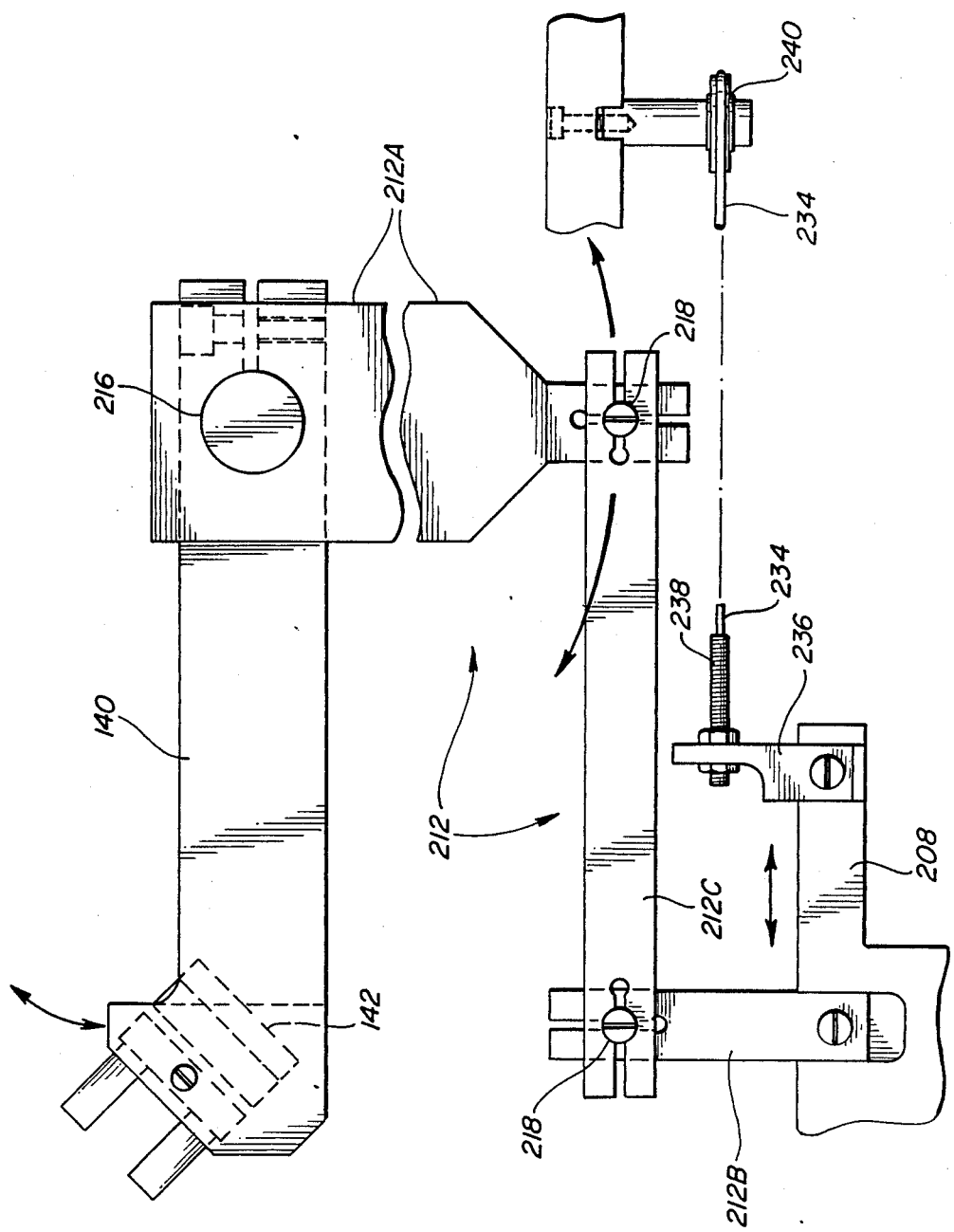
FIG. 4 illustrates operation of a linear slide for controlling pivotal movement of a slow scan mirror and reciprocal movement of a nonlinear grating used to control the fast scan of the light beam scanning device of FIG. 2.

FIGS. 2-4 illustrate structural details of a working embodiment of light beam scanning apparatus operable in accordance with the method of the present invention. Corresponding elements in the embodiment of FIGS. 2-4 will be identified by the same numerals as those used with reference to the schematic diagram of FIG. 1. In FIG. 2, the writing beam 104 is directed to a folding mirror 200 which directs the beam upwardly and out of the plane of FIG. 2 such that it falls upon the slow scan mirror 142 supported by the pivot arm 140. The writing beam 104 is directed by the slow scan mirror 142 upon a front mirror surface 138A of the galvanometer mirror means 138. The writing beam 104 is thus scanned by means of the fast scan operation of the galvanometer mirror means 138 and the slow scan operation of the pivot arm 140 such that it is directed uPon the f sine theta lens 136 which in turn focuses the writing beam 104 onto the corresponding flat stationary scanning surface 134 which is then in focus.

The working embodiment of the invention as shown in FIGS. 2-4 includes a lead screw 202 which is driven by a motor 204. The position of the lead screw 202 is monitored by means of an encoder 206 for precision control of the tricolor film recorder 100. The lead screw 202 is connected to drive a linear slide 208 by means of an interconnecting link 210. The linear slide 208 controls the pivoting movement of the slow scan pivot arm 140 as best shown in FIG. 4 and also controls the reciprocal movement of the grating 154 relative to the galvanometer mirror means 138.

As shown in FIG. 4. the linear slide 208 is connected to the slow scan pivot arm 140 by means of a linkage 212. The pivot arm 140 is secured to a cylindrical shaft 216 which is in turn secured to an upper vertical arm 212A of the linkage 212. A lower vertical arm 212B is secured to the linear slide 208. A horizontal interconnecting link 212C is secured between the upper and lower vertical arms 212A and 212B by means of flexural pivots 218 commercially available from the Bendix Corporation.

Due to the arcuate movement of the upper vertical arm 212A of the linkage 212, the pivotal movement of the pivot arm 140 is not directly proportional to the linear motion of the linear slide 208. This error and also compensation for vertical linearity of lines scanned by the tricolor film recorder 100 are compensated by measuring the position of the lead screw 202 by means of the encoder 206 and controlling the speed of the lead screw as a function of its position.

Referring once again to FIG. 2, the tricolor film recorder 100 further comPrises a second light source means comprising the infrared laser diode 150 which generates a reference beam 152 which is directed onto the rear mirror surface 138B of the galvanometer mirror means 138. As will be apparent, the path of the reference beam 152 is folded in the working embodiment of FIGS. 2-4 to reduce the physical size of the scanning device. The rear mirror surface 138B of the galvanometer mirror means 138 reflects the beam 152 onto and through the grating 154 which is cylindrical and formed onto or secured to the upper portion of a retroreflector 230.

As shown in FIG. 3, the beam 152 travels from the galvanometer means 138 over the top of an angularly oriented mirror 232 such that the reference light beam 152 is scanned across and through the grating 154 and reflected by the retroreflector 230 to the reflecting surface of the mirror 232. The reference light beam 152, represented by the arrowtail 152A, goes into the plane of FIG. 3 where it is retlected to the right by the rear mirror surface 138B of the galvanometer mirror means 138 to be directed out of the plane of FIG. 3 by the mirror 232 as represented by the arrowhead 152B. The beam 152, after it has been modulated by the grating 154, is reflected by the mirror 232 to detector means comprising an infrared photodetector 156 which generates a control signal representative of the position of the scanning light beam 104 in the first or fast scan direction in response to the reference light beam 152.

To correct for distortion in the scanned image, the grating 154 is reciprocally moved relative to the galvanometer mirror means 138. The reciprocal movement of the grating 154 is controlled by the linear slide 208 by means of a cable 234. The cable 234 is connected to the linear slide 208 by means of a support arm 236 which receives a threaded terminal end 238 of the cable 234 to permit adjustment of the cable length, see FIG. 4. The cable 234 extends around a first freely rotating idler pulley 240 and is secured to a pulley 242 which is supported for rotation on a shaft 244, see FIG. 3.

The grating 154 and retroreflector 230 are supported on a frame 246 which is in turn supported by a pair of flat spring members 248. The spring members 248 define a parallelogram mounting arrangement to permit linear movement of the platform 246 and hence the grating 154 and retroreflector 230 as indicated by the arrow 250. The reciprocal movement of the platform 246 and hence the grating 154 and retroreflector 230 is controlled by an eccentric cam formed by a disc-shaped member 252 which is mounted eccentric to the pulley 242.

There are four geometric errors which commonly occur and are interrelated when a light beam scanning device is controlled to scan a flat stationary field. These errors are: (1) horizontal line bow which occurs if the elevation varies as the light beam is scanned over the azimuth with the elevation corresponding to the slow scan and the azimuth corresponding to the fast scan; (2) vertical line bow which results if the azimuth varies as the elevation is swept; (3) horizontal line linearity which results from variations in the writing light beam velocity and distance traveled at the extremes of the azimuth or fast scan sweep as opposed to the speeds and distances traveled by the beam at the center of the sweep; and, (4) vertical line linearity which is the same as horizontal line linearity but with the angular axes reversed.

Three major methods of error correction are applied in the light beam scanning method and apparatus of the present invention: (1) static correction by optical or structural means which do not require control circuitry or mechanical movement; (2) electronic correction wherein control signals are altered during image scanning; and (3) mechanical correction wherein parts of the system are moved during the scanning operation. Since corrections for fast scan or horizontal imaging errors must be performed over their entire operating range for each scan line while corrections for slow scan or vertical imaging errors require correction over the entire range of the correcting method only for each image, it is important to use static correction where possible for compensation of horizontal distortions while mechanical or electrical corrections may be more conveniently applied to vertical distortions.

In the method and apparatus of the present invention, it has been determined that static correction of horizontal line bow can be performed by using an f sine theta lens system; however, the f sine theta lens system increases the other three imaging errors. It has also been determined that a static correction can compensate for the increased high speed error of horizontal line linearity by utilizing a cylindrical grating having line spacing proportional to 1/(sine theta). This nonlinear grating together with the f sine theta lens system produces exact compensation for the horizontal line linearity errors.

The vertical line bow error is corrected by the described mechanical system which moves the grating 154 back and forth relative to the fast scan axis or the galvanometer mirror means 138. It has been determined that the grating translation is a simple harmonic relation to the slow scan angle or elevation which can be generated by a simple harmonic cam coupled to the slow scan mirror as described.

The vertical line linearity error is quite small such that correction may not be required in many applications. However, such correction can be easily performed electronically and incorporated into the correction factor which is required to compensate for the nonlinear movement of the slow scan mirror 142. While it is possible to convert the linear motion of the lead screw 202 into linear slow scan motion of the elevation by means of a cable/sheave arrangement, the elasticity of the cable 234 can produce errors in the slow scan movement. Accordingly, the pivoting linkage 212 is used in place of a cable/sheave such that the elasticity in the interconnection is substantially eliminated. However, as previously noted, the nonlinearity of the slow scan produced by use of the pivoting linkaqe 212 must be corrected and is done electronically by measuring the position of the lead screw 202 and biasing the lead screw 202 position control by an amount proportional to its position to thereby control the lead screw 202 speed as a function of its position. Vertical line linearity can also be corrected electronically by means of superimposing a compensating signal on the lead screw position bias signal.

Having described the invention in detail and by way of reference to preferred embodiments thereof, it will be apparent that other modifications and variations are possible without departing from the scope of the invention defined in the appended claims.

What is claimed is:

1. A light beam scanning device comprising:
   first light source means for providing a scanning light beam;
   a flat stationary scanning surface to be scanned by said light beam;
   lens means for focusing said light beam onto said flat stationary scanning surface;
   galvanometer mirror means for repetitively scanning said light beam across said flat stationary scanning surface in a first fast scan direction; and
   pivoting mirror means for receiving said light beam from said first light source means and scanning said light beam onto said galvanometer mirror means in a second slow scan direction perpendicular to said first fast scan direction to thereby raster scan said light beam onto said flat stationary scanning surface through said lens means, said pivoting mirror means comprising a pivot arm mounted for rotation about an axis through one end thereof and a scanning mirror fixedly mounted to an end of said pivot arm opposite to said one end, said pivot arm pivotally moving said scanning mirror about said axis to slow scan said light beam.

2. A light beam scanning device as claimed in claim 1 wherein said galvanometer mirror means is positioned intermediate said scanning mirror and said axis.

3. A light beam scanning device as claimed in claim 2 wherein said galvanometer mirror means is positioned a distance s from said axis and said scanning mirror is positioned a distance 2s from said axis.

4. A light beam scanning device as claimed in claim 1 wherein said lens means comprises an f sine theta lens.

5. A light beam scanning device as claimed in claim 4 wherein said galvanometer mirror means comprises a front mirror surface and a rear mirror surface, said scanning light beam being directed to said front mirror surface and said light beam scanning device further comprising:

second light source means for providing a reference light beam which is directed onto said rear mirror surface of said galvanometer mirror means;

grating means for defining the position of said scanning beam in said first direction, said grating means being scanned by said reference beam which is reflected from said rear mirror surface of said galvanometer mirror means; and detector means for generating a control signal representative of the position of said scanning light beam in said first direction in response to said reference light beam after it has been modulated by said grating means.

6. A light beam scanning device as claimed in claim 5 wherein said grating means is cylindrical and nonlinear.

7. A light beam scanning device as claimed in claim 6 wherein the spacing of the grating lines in said grating means is proportional to 1/(sine theta).

8. A light beam scanning device as claimed in claim 7 wherein said grating means is reciprocally moved relative to said galvanometer mirror means.

9. A light beam scanning device as claimed in claim 8 wherein the reciprocal movement movement of said grating means is synchronized with the operation of said pivoting mirror means.

10. A light beam scanning device as claimed in claim 9 further comprising a lead screw and a linear slide for controlling said pivoting mirror means and said grating means via a pivot linkage and an eccentric cam, respectively.

11. A light beam scanning device as claimed in claim 10 further comprising control means for monitoring the position of said lead screw and controlling the speed of said lead screw as a function of its position to thereby control the speed of movement of said pivoting mirror means and said grating means.

12. A method for raster scanning a light beam over a flat stationary field comprising the steps of:

supporting a pivot arm for pivotal movement about an axis through one end thereof;

fixedly mounting a scanning mirror to an end of said pivot arm opposite to said one end;

directing a scanning light beam onto said scanning mirror;

pivotally moving said pivot arm to slow scan said scanning light beam onto galvanometer mirror means;

operating said galvanometer mirror means to fast scan said scanning light beam onto lens means; and focusing said scanning light beam onto the flat stationary field through said lens means.

13. A method for raster scanning a light beam over a flat stationary field as claimed in claim 12 wherein said lens means comprises an f sine theta lens.

14. A method for raster scanning a light beam over a flat stationary field as claimed in claim 13 further comprising the step of positioning said galvonometer means intermediate said axis and said pivoting mirror.

15. A method for raster scanning a light beam over a flat stationary field as claimed in claim 14 wherein said galvanometer means is positioned a distance s from said axis and said pivoting mirror is positioned a distance 2s from said axis.

16. A method for raster scanning a light beam over a flat stationary field as claimed in claim 13 further comprising the steps of:

providing said galvanometer mirror means with a front mirror surface and a rear mirror surface;

directing said scanning light beam onto said front mirror surface of said galvanometer means;

directing a reference light beam onto said rear mirror surface of said galvanometer mirror means;

positioning grating means to be scanned by said reference beam as it is reflected from said rear mirror surface of said galvanometer mirror means to define the position of said scanning light beam during said fast scan of said scanning light beam; and generating a control signal representative of the position of said scanning light beam during said fast scan in response to said reference light beam after it has been modulated by said grating means.

17. A method for raster scanning a light beam over a flat stationary field as claimed in claim 16 wherein the spacing of the grating lines in said grating means is proportional to 1/(sine theta).

18. A method for raster scanning a light beam over a flat stationary field as claimed in claim 17 further comprising the step of reciprocally moving said grating means relative to the galvanometer mirror means.

19. A method for raster scanning a light beam over a flat stationary field as claimed in claim 18 wherein the steps of moving said pivoting mirror means and moving said grating means are synchronously performed.

* * * * *